O. LOBECK.
PROCESS AND APPARATUS FOR STERILIZING MILK AND OTHER LIQUIDS.
APPLICATION FILED FEB. 18, 1915.

1,369,345.

Patented Feb. 22, 1921.

Inventor
Oskar Lobeck

By his Attorney
John Lotka

Inventor
Oskar Lobeck

UNITED STATES PATENT OFFICE.

OSKAR LOBECK, OF LEIPZIG, GERMANY, ASSIGNOR, BY MESNE ASSIGNMENTS, TO THE CHEMICAL FOUNDATION, INC., A CORPORATION OF DELAWARE.

PROCESS AND APPARATUS FOR STERILIZING MILK AND OTHER LIQUIDS.

1,369,345.   Specification of Letters Patent.   Patented Feb. 22, 1921.

Application filed February 18, 1915. Serial No. 9,217.

*To all whom it may concern:*

Be it known that I, OSKAR LOBECK, a citizen of of the German Empire, and resident of Leipzig, Germany, have invented certain new and useful Improvements in Processes and Apparatus for Sterilizing Milk and other Liquids, of which the following is a specification.

My invention relates to the sterilizing of milk and other liquids, and is based on the discovery which I have made that by subjecting such liquids to sudden changes of temperature, or "temperature-shocks," the micro-organisms will be killed very readily in a short time and at a relatively low temperature, so that the liquid will not be affected injuriously as regards its natural and biological properties (such as taste, digestibility etc.). In carrying out this improved sterilizing process, it was my practice at first to produce a spray of the liquid to be treated, by means of stationary nozzles and to throw this spray against a surface upon which the sprayed liquid was allowed to flow down as a film, the sudden change of temperature being exerted on the liquid either where it forms the spray or where it flows as a film, or both. Under these circumstances difficulties were often experienced owing to the formation of leather-like skins or deposits on the surface against which the liquid and particularly milk is sprayed, these deposits being poor conductors of heat and thus interfering with the proper heating of the liquid film. In the further development of my invention, I have succeeded in avoiding the defect just mentioned, by bringing the milk or other liquid while under the influence of centrifugal force, into a condition of exceedingly small thickness, so that every particle of the liquid can be readily acted on by the heating agent, that is to say, the parts used for projecting the liquid are rotary instead of stationary, so that a centrifugal or whirling action is obtained. The apparatus for carrying out the improved form of my invention may assume varied forms, but will always comprise a rotary projecting device and a surrounding wall against which the projected liquid is thrown by centrifugal action, said surrounding wall preferably exhibiting at every point a circular cross section the center of which is upon the axis of rotation of the projecting device.

In the accompanying drawings, Figures 1 to 5 inclusive, and Figs. 7 to 14 inclusive illustrate each a different form of apparatus for carrying out my invention, the projecting device being omitted from Fig. 1.

Figures 1, 2, 3:
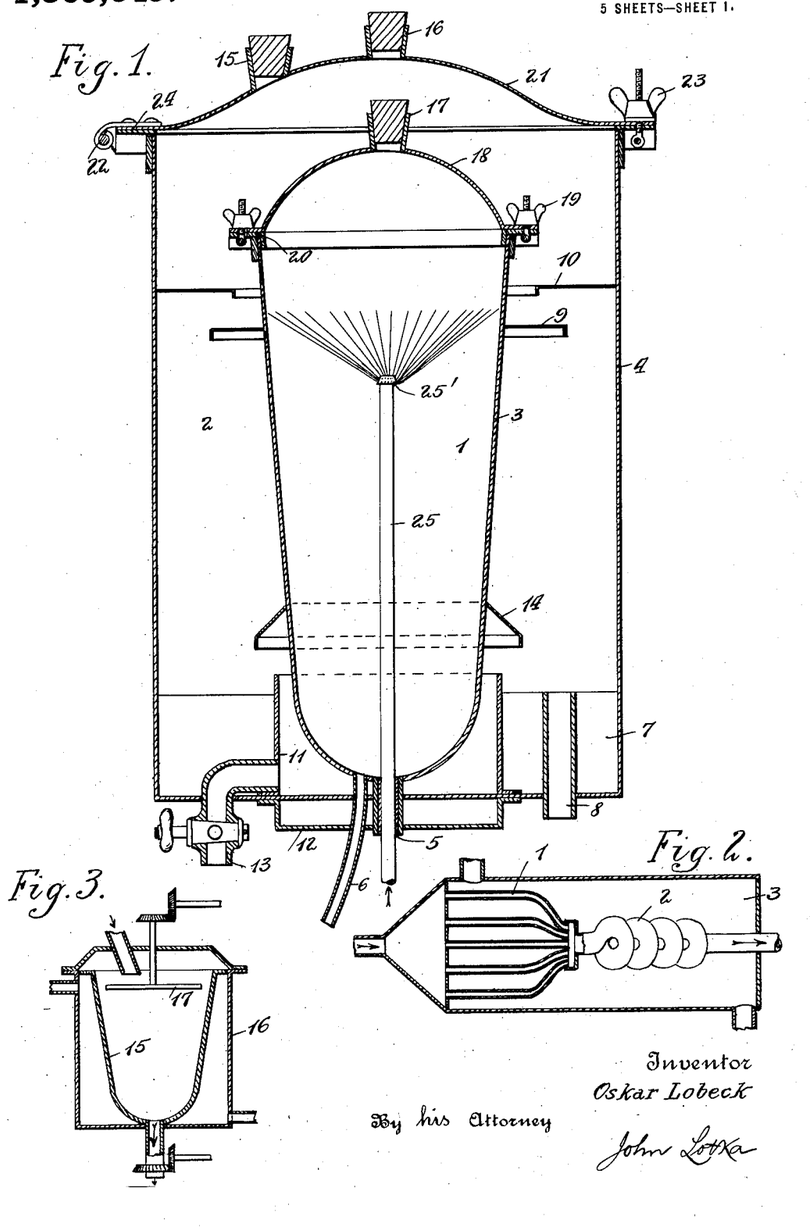

The apparatus shown in Fig. 1 comprises an inner receptacle 1 within which the liquid is to be projected in a condition of great thinness, the wall 3 of said receptacle being preferably tapered toward the bottom as shown; an outer wall 4 forms a heating space 2 around the inner receptacle. At its bottom, the inner receptacle is provided with an axial tube or nipple 5 for the passage of a member connected with any suitable spraying device; I may employ for instance a metal tube 25 provided at its upper end with a spray nozzle 25' of the type in which the liquid is whirled, nozzles of this type being well known in connection with lawn sprinklers or garden hose. When I speak of a rotary projecting device, I do not wish to restrict myself to constructions in which the liquid-projecting element rotates, inasmuch as in some constructions the rotary projecting action is obtained (as by means of spiral or helical channels) with a stationary structure. As a rule however, I will prefer a structure in which the spray-producing device itself rotates, and several examples of suitable structures are illustrated in Figs. 5 to 14 and described in detail below. The sterilized liquid flows from the apparatus through the outlet tube 6. The lower portion of the outer receptacle 2 is filled with water as indicated at 7, an overflow 8 being provided to determine the maximum level of the water. Baffle plates 9 and 10 extended respectively from the inner wall 3 and the outer wall 4, serve to direct the steam generated from the water 7, toward the upper portion of the inner wall 3, preferably in about the same plane in which the sprayed liquid is thrown against said wall. The heating of the water 7 may be accomplished in any suitable manner, as by means of gas burners (not shown) located under the bottom of the water chamber. A partition 11 may be employed to keep the water 7 out of contact with the lower portion of the inner wall 3, and a horizontal wall 12 may be employed to prevent the hot gases from the burners from coming in direct contact with the inner wall 3; such direct heating might be too energetic and cause the objectionable formation of crusts or deposits. Any water resulting from the condensation of steam on the lower part of the inner wall 3 will be discharged through a pipe 13 provided with a cock. Any water formed by the condensation of steam on the upper portion of the wall 3 will be directed, by a deflector 14, back to the main body of water 7. Openings 15, 16 and 17 normally closed by plugs are provided for the introduction of thermometers, gages, or other instruments for determining the temperature or pressure within the space 2 and the inner chamber 1 respectively. The parts 15, 16 and 17 may however be omitted, and any other suitable heating device may be substituted for the one shown, thus I may employ a heating coil instead of the space 2, or I may heat the wall 3 directly by projecting against its outer surface, live steam or superheated steam.

The apparatus is constructed of metal and in order to render its interior readily accessible for cleaning and other purposes, I prefer to construct it with movable or removable parts. Thus in Fig. 1, the inner receptacle has a removable cover 18 normally held in place by wing nuts 19 applied to pivoted screws, a washer 20 being preferably interposed between said detachable cover and the adjacent portion of the inner wall 3; the outer wall 4 has a cover 21 hinged thereto, as at 22, a wing nut 23 being applied to a pivoted screw located at a point diametrically opposite to the pivot, and a washer 24 is preferably employed at this joint also.

In some cases, sterilization has been obtained by causing the liquid to be treated, to flow down a heated surface, the liquid forming a very thin film. Here too it has been found in practice that there is danger of the formation of crusts, etc., and if the thickness of the film is increased to avoid this difficulty, the heating will take place much more slowly, so that the process must be carried on for a greater length of time, but this, as stated above, affects detrimentally the taste and other properties of the liquid. In order to obviate this difficulty, I have in some cases adopted arrangements which provide for a sudden energetic preliminary heating of the liquid in a finely divided form before it is brought upon the surface on which the main heating for sterilizing purposes takes place. For this preliminary heating the liquid is brought to a condition of greater thinness than during the subsequent main heating, and owing to this, the preliminary heating brings the milk or other liquid substantially to the sterilizing temperature, so that the object of the subsequent main heating is to keep up such temperature rather than to reduce it; the main heating therefore may take place upon surfaces of relatively small extent, and the liquid may pour down such surfaces as a relatively thick film so as to avoid the danger of burning or forming crusts. The preliminary heating lasts only for a short time and may be carried out with the aid of stationary or rotary heated surfaces.

A typical construction for carrying out the improved process just described is shown in Fig. 2 where the liquid is first forced through a series of fine tubes, for instance capillary tubes 1, in which the temperature of the liquid is increased suddenly, the extreme thinness of the individual thread-like streams of the liquid facilitating its quick heating. The fine jets are then brought together and united to a single stream in a tube 2 of larger diameter, which may have the form of a spiral or other suitable shape; within this relatively large tube the liquid particles are mixed and are kept for a suitable length of time at the proper sterilizing temperature, it being understood that at this time the body of liquid has a much larger cross section so as to avoid the detrimental effects referred to above. The heating may be carried out in any suitable manner, as by means of a steam jacket 3.

In apparatus comprising capillary tubes or the like, it may be advisable in some cases to conduct the heating operation under pressure so as to avoid boiling.

I may also employ apparatus of a type in which the atomizing condition of exceedingly small thickness of the liquid is obtained with the aid of rotary surfaces or bodies. Thus, the receptacle 15 shown in Fig. 3 is surrounded by a steam jacket 16 and contains at its upper portion a rotary plate 17 or the like to which the milk or other liquid is supplied, being then thrown out by centrifugal force and spread out and sometimes also broken up or atomized, in which condition it reaches the inner surface of the receptacle 15. This latter may be stationary or it may rotate in the same direction as the plate 17 or in the opposite direction. On the rotary plate the liquid being in the condition of a film, or of great thinness, is heated so as to undergo a sudden rise of temperature, and after this preliminary heating the liquid reaches the main heating surface 15 on which however it may form a film of relatively greater thickness.

Figure 4:
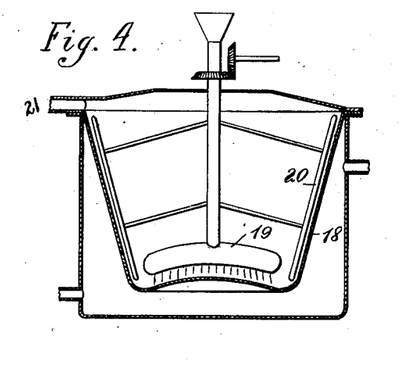

In Fig. 4, the main heating surface 18 is formed upon a tapering receptacle, the bottom of which is curved more or less inwardly. To this receptacle the liquid to be sterilized is fed by a distributing device 19 which as shown is rotary and which supplies the liquid to the bottom in such a way as to form a very thin film which flows toward the edge of the bottom, where it collects to a certain degree and is then distributed upon the main heating surface 18 by means of an agitator 20 of well-known character, whereupon the sterilized liquid is discharged at the outlet 21.

Figure 5:
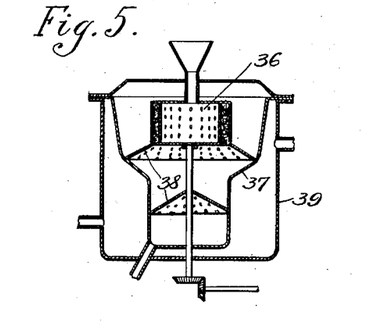

According to Fig. 5, the liquid to be sterilized is supplied to a rotary sieve 36 preferably having two perforated walls with a filtering material such as wadding between them. Centrifugal force will then project the liquid in a state of exceedingly small thickness against the upper part of a surrounding wall 37 on which the liquid is spread in a very thin film so as to undergo a sudden rise of temperature, said wall being heated in any suitable manner as by a steam jacket 39. The liquid then flows down on the inside of the wall 37, and inasmuch as the said wall is contracted toward the bottom, the film will increase in thickness at said lower portion so as to prevent the formation of a crust or skin adhering to the said wall. Perforated plates 38 inclined downwardly and outwardly may be arranged within the central chamber in order to catch any liquid particles which may be thrown off and to conduct such particles to the heating surface.

Figure 6:
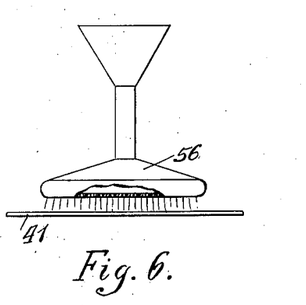
Fig. 6 is a side elevation with parts in section, of another form of projecting device. All those figures which show the surrounding wall against which the liquid is thrown, are central vertical sections of the apparatus.

For the purpose of delivering the liquid to rotary plates such as the one shown in Fig. 3, I may employ devices of various kinds; as an example, I have shown in Fig. 6 a distributing receptacle 56 provided with a perforated bottom so as to discharge the liquid in the form of a spray.

Figure 7:
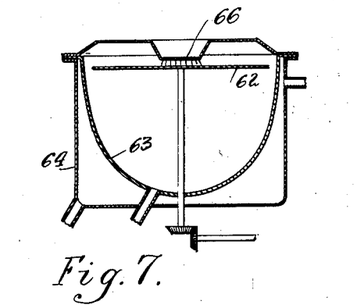

In Fig. 7 I have shown a rotary plate 62 arranged within the receptacle 63 heated, say, by means of the steam jacket 64. A funnel-shaped inlet, provided with a perforated bottom 66, discharges the liquid in the form of a spray, on the said rotary plate 62. The plate breaks the liquid up into very fine drops or into a mist, while the curved and contracted form of the receptacle 63 causes the liquid to spread in a film the thickness of which increases as the liquid approaches the outlet.

Figure 8:
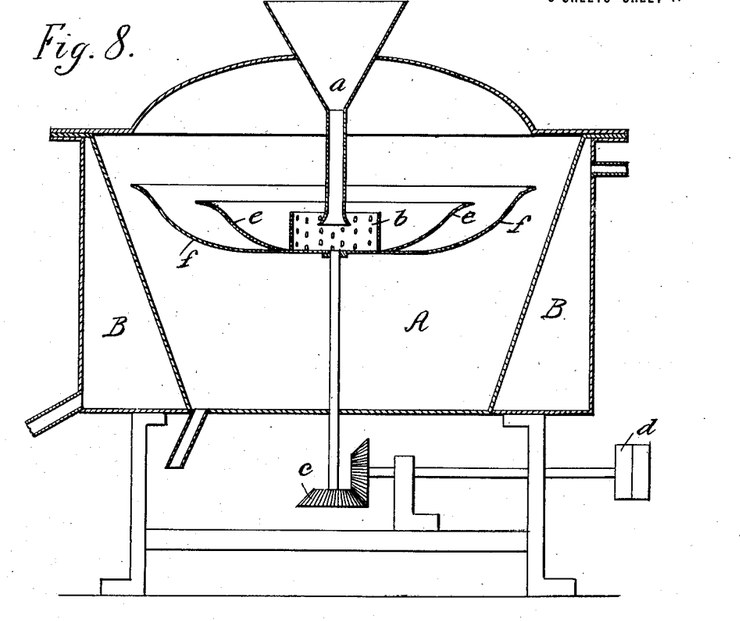

According to Fig. 8, the chamber A, surrounded by the steam jacket B, or heated in any other suitable manner, contains a disk provided with impinging or deflecting surfaces $e$, $f$ and with a perforated cylindrical wall $b$, said disk with its perforated wall and deflectors being rotated by any suitable mechanism, such as the one indicated at $c$, $d$. The liquid is supplied through the funnel $a$ and upon reaching the rotary disk is thrown by centrifugal force through the apertures of the wall $b$, the spray or mist thus produced impinging on the deflector $e$ which further breaks up the liquid and directs it against the second deflector $f$, where the liquid is broken up still more; thereupon the liquid reaches the inner surface of the wall separating the chamber A and B, and is there subjected to a sterilizing temperature, in the same manner as in the constructions described above. The shape and number of the deflectors may be varied.

Figure 9:
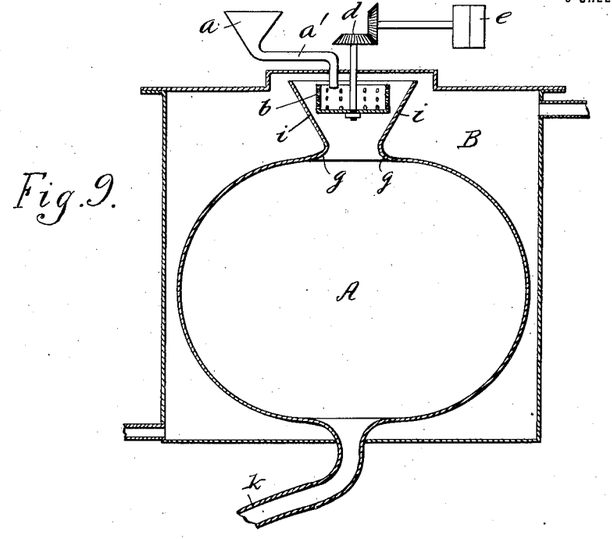

In Fig. 9 the liquid flowing into the funnel $a$ is delivered through the tube $a'$ to a plate or drum having a cylindrical wall $b$ which may be perforated, said plate being rotated, say by driving mechanism $d$, $e$. The inner receptacle A is provided, adjacent to the said rotary distributer, with a funnel-shaped portion $i$, which, like the remainder of the said receptacle, is heated by the steam jacket B. Owing to this funnel shape, which produces a contraction indicated at $g$, $g$, the liquid projected by the rotary distributer cannot fall directly into the lower portion of the receptacle or chamber A, but is compelled to first flow along the heated wall $i$. The lower portion of the receptacle A may be bulged as shown, or of any other suitable shape. The sterilized liquid is discharged at $k$.

Figure 10:
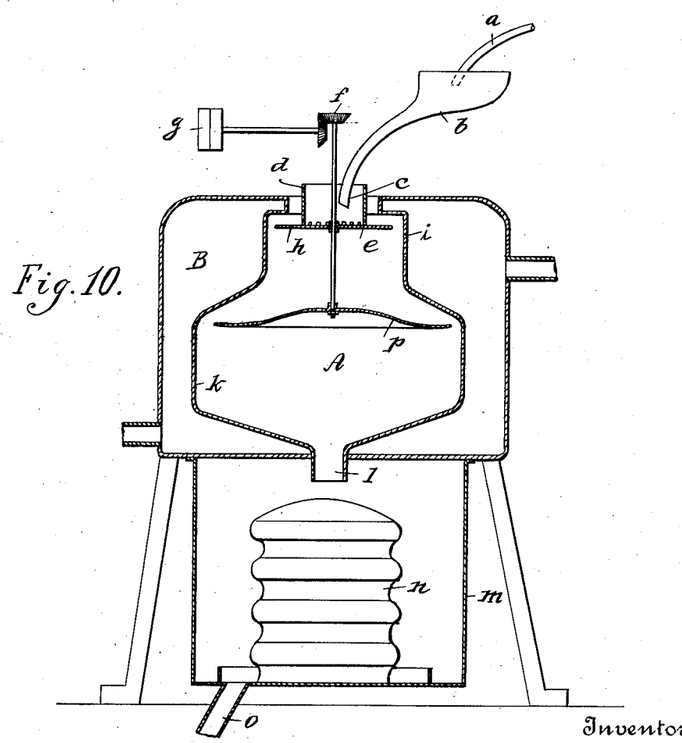

In Fig. 10 the liquid coming from $a$, $b$, $c$ is delivered to the rotary drum $d$ and projected through the openings $e$ and over the plate-like edge $h$ against the upper wall portion $i$ of the receptacle A; any liquid particles which may drop off the said wall at the point where it flares downwardly, will reach the rotary deflector $p$ and will thus be thrown back on the inner surface of the lower wall portion $k$. From the outlet $l$ located at the bottom of the receptacle A, the sterilized liquid may be discharged directly upon a cooler $n$ surrounded by a protecting wall $m$, and may then be filled directly into bottles from the outlet $o$ of the cooler.

Figure 11:
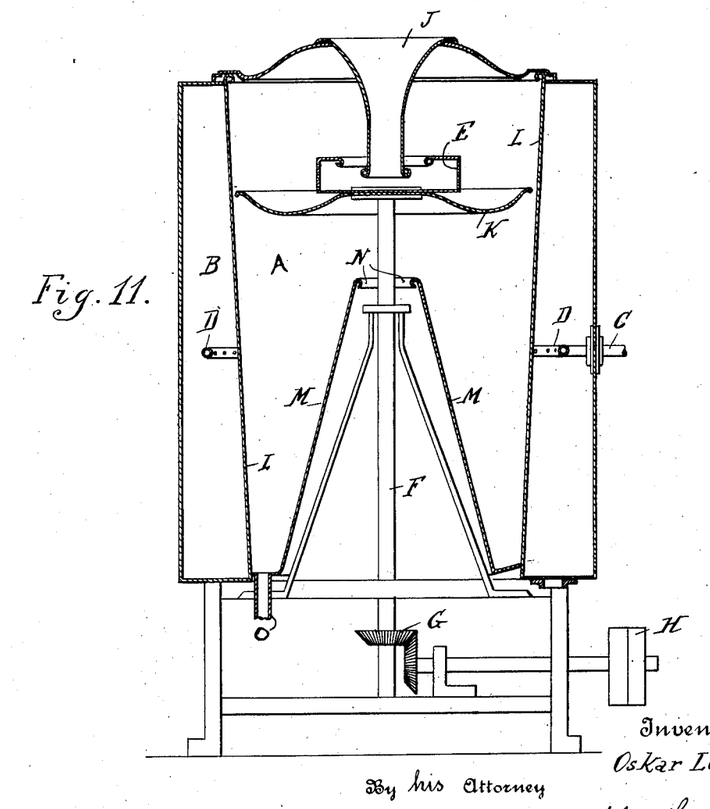

Fig. 11 shows a form of apparatus in which I do not only bring the liquid into a condition of exceedingly small thickness, as in the forms described above, but I secure a thorough aeration of the liquid and thereby a virtually complete removal of all gases which may be contained in the liquid originally, or which may be evolved therefrom during the heating process. The treatment chamber A is surrounded by the heating chamber (steam jacket) B provided with steam supply pipe C and perforated coil D. A shaft F rotated by mechanism G, H carries a rotary device E which in the particular construction illustrated is combined with the distributer, although this is not essential. The liquid supplied through the funnel J is delivered to the drum E and passes through the perforated or slitted wall thereof to contact with the heated surrounding wall L, and then, forming a film, flows down to the outlet O. Below the drum E, and preferably secured to the shaft A at the same point, is a plate K, of any suitable shape and extending into proximity of said wall L.

The object of this disk is, first, to thoroughly agitate the air, and second, to throw back against the wall L, any liquid particles that may rebound therefrom and thus might escape sterilization. In the particular construction shown, the plate has been given such a shape that the liquid particles will be thrown back against the wall L at the same level at which said wall is struck by the particles thrown off by the drum, so that said particles will have to flow down the surface of said wall the full length of their intended path. At the (lower) end of the apparatus E, I provide upwardly-extending members M which may be solid and leave an opening N for the entrance of a sufficient amount of air, or these members may be of skeleton construction, or perforated to a greater or less extent. The air laden with gases may thus leave the apparatus at a different point from the outlet O provided for the sterilized liquid, for instance, such air may leave through the milk inlet J. Inasmuch as the member M is inclined toward the wall L, it tends to direct to the outlet O, any liquid which may have jumped off the wall L, and the heat which said member M receives by convection from the other parts of the apparatus, will assist in sterilizing completely, any particles thus caught. The supply of the liquid may advantageously be effected by means of rotary superposed disks having openings through which the liquid is thrown outwardly by centrifugal force. A very efficient and rapid heating is obtained by this arrangement which causes the liquid to be thrown out in very thin films through the walls intervening between said disks, and the heating surface is utilized in the proper way, avoiding the formation of thick films. Instead of a single disk or plate K, several such plates may be employed. These plates would cause a whirling motion of the air, which has access to all these parts, and besides, such additional plates would throw back on the wall L, any particles which should be scattered from it, or from a plate located higher up. The wall may be of any suitable construction, smooth or corrugated, stepped, flaring, etc., the flaring construction being preferred. The funnel J is removable readily. It is not necessary that a unitary or integral apparatus be employed for heating the liquid, but the apparatus may consist of a so-called system, comprising a plurality of like or dissimilar elements or parts. In the drawing, the distributer alone is arranged to rotate. In some cases, the distributer may be stationary, while the surrounding parts rotate, or both elements may be rotary. In this form of my invention, the important feature is a thorough aeration of the liquid while it is being sterilized by heat.

Figure 12:
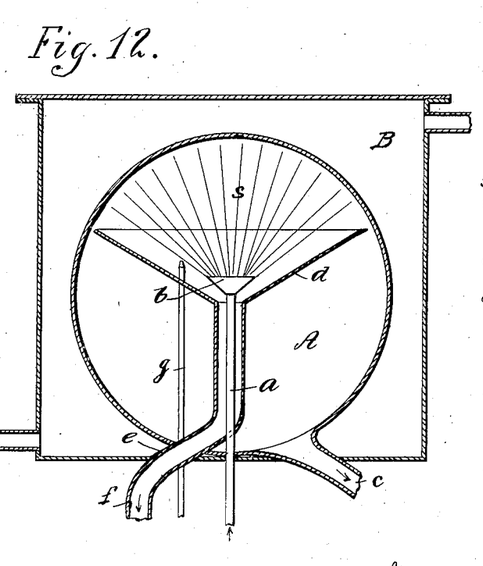

Another form of my invention is illustrated in Fig. 12. In this case the liquid is thrown upon the heated wall in the condition of a very fine spray so that it will cover it as it were with a veil or mist, forming a layer of exceeding fineness. The heating may be accomplished by causing the liquid to flow or trickle over highly heated surfaces, either smooth or corrugated. These surfaces may also take the shape of rotary walls, drums, or disks, or may be analogous to centrifugal separators. After cooling, the liquid may be exposed to the action of ultraviolet rays, if desired, to insure the killing of all germs. As before, A is the treatment chamber and B the heating chamber or jacket. The milk or other liquid, introduced at a, is atomized at b by means of a suitable nozzle. The fine spray, indicated at s, is thrown against the upper part of the wall which forms the receptacle or chamber A, and is spread on said part of the wall as a very thin film or mist. The liquid then flows down on the inner surface of said wall and finally is discharged through the outlet c. Preferably, a stationary funnel d is provided within the chamber A, said funnel reaching very close to the wall, but leaving a sufficient space for the film to flow through. Any particles which fail to flow down the wall of the receptacle A, will be caught by the funnel d and delivered through a pipe f to a collector tank (not shown) or the like, from which such particles are returned to the spraying device or nozzle. Preferably the operation is conducted in the presence of steam, as by injecting steam together with the liquid for spraying the same, or when the spray is produced in some other manner, steam may be injected separately, as by a pipe and nozzle, suggested at g, the supply of steam being regulated in any approved way.

Figure 13:
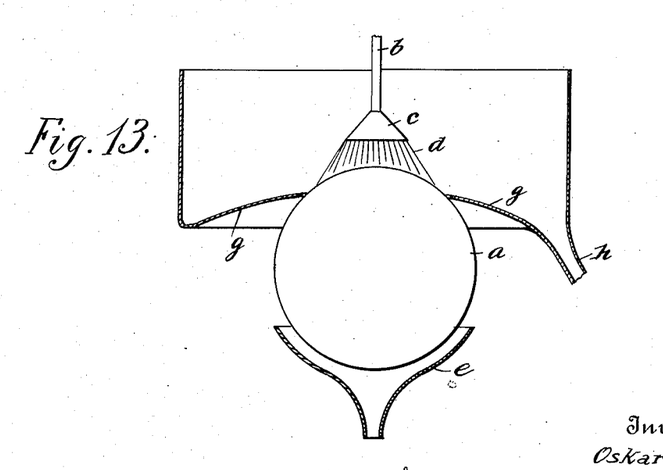

In Fig. 13 I have shown a body a shaped as a roller or drum, the liquid being supplied to the upper portion of said body by a spray-nozzle c fed by a pipe b. The spray d forms a thin film on the rotating body a, this film being carried around as the body rotates, and finally the sterilized liquid passes into a funnel e from which it is conveyed to a cooler or other suitable apparatus, for further treatment. Of course, the body a is heated, its hollow construction lending itself readily to the location of a heating apparatus within the body a. Shields or deflectors g serve substantially the same purpose as the funnel d of Fig. 12, that is to say, they will catch all particles which may glance off the surface of the body a, and will conduct said particles to the outlet h, connected as before, with the collector or the like from which the liquid may be returned to the spray nozzle. The exact construction of the spraying or distributing devices is immaterial, but the important point is that the liquid should be thrown against the surrounding heated wall, not in the shape of continuous jets, as heretofore, but broken up into a spray or mist, so that it may form a very thin film on said heated wall.

As a further improvement, in connection with any of the modes of procedure described above, I may employ a vacuum during the heating operation. The effect of this is particularly noticeable when the liquid is atomized in any way. In this case it is also advisable to first put the liquid under pressure and then subject it to a vacuum. This enables me to employ a relatively low temperature, so as to avoid all danger of injury to the milk or other liquid. It is immaterial whether the atomizing or spraying of the liquid is obtained by steam pressure or otherwise, and further, whether the heating is effected directly or indirectly. Again, pressure may be applied a number of times before using the vacuum.

Other forms of apparatus may be devised, approximating more or less well-known forms of pasteurizing apparatus, but embodying means according to my present invention for subdividing the liquid at its entrance, into very fine particles, so that it may be brought by a sudden rise of temperature, almost or fully to the sterilization temperature; the heating surfaces against which the liquid is thrown subsequently, therefore serve chiefly to complete the heating, or to maintain the sterilization temperature, and this can be done with a relatively thick film without impairing the complete removal of germs.

Apparatus such as described above, or similar apparatus, may also be used for carrying out a slightly different species of my process. Before my present invention, I had ascertained that the elimination of germs is promoted by sudden changes of temperature and pressure, and particularly allows such process to be carried out at a relatively low temperature and in a very short time, so as to avoid injurious effects upon the liquid under treatment. Prior to my present invention, I had placed the liquid under pressure and, while reducing the pressure suddenly, directed such liquid against the heating surface. According to the species of my present invention now under discussion, the liquid is thrown against the heating surface forcibly, so that the impact will place the liquid under pressure, and the reduction of pressure is simultaneous with the immediately following downward flow of the liquid on the heating surface, during which the liquid is brought rapidly to the sterilization temperature. This species of my process may be carried out in a great many ways. The simplest consists in leading the liquid on a rotary plate or disk of the character shown in some of the drawings described above, the liquid being thrown by centrifugal action against the surrounding heating surface, with great force, so as to subject the liquid to strong pressure, but immediately thereupon the pressure is reduced or removed as the liquid flows down the heating surface. As I have said, several such plates may be employed, one above the other; or the liquid may be fed through rotary tubes, which likewise will throw the liquid forcibly against the heating surface, by centrifugal action. Finally, this form of the process may be carried out without rotating elements; in particular, compressed air or other gases under pressure may be used to project the liquid forcibly against the heating surface, but in this case also rotating bodies may be employed. The use of gases under pressure also offers the advantage of increasing the force of impact, and therefore the pressure, with which the liquid strikes the heating surface, in view of the high velocity imparted to the liquid, and at the same time the liquid is aerated thoroughly, which is of great importance in some cases, as with milk. When rotary distributing devices are employed, the compressed air may also be utilized to rotate said devices. The compressed air may in some cases be heated before reaching the apparatus. Finally, the pressure resulting from the impact of the liquid may be produced, not in a compact body of liquid, but in the subdivided form of liquid resulting from spray nozzles or the like, said fine particles being thrown very forcibly against the heating surface so as to produce a condition of high pressure followed immediately by a reduction or relief of pressure; this change of pressure conditions is very valuable in bringing about a thorough elimination of micro-organisms in a very short time and at a relatively low temperature.

Figure 14:
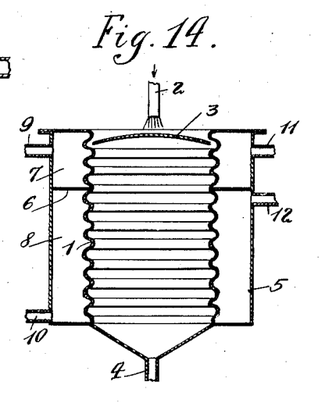

Another species of my improved process contemplates delivering the liquid to be treated, to a surface heated to a temperature above the sterilization temperature, which brings the liquid to the sterilization temperature, whereupon the liquid is brought into contact with another heating surface which is heated only to the sterilization temperature. In all the apparatus forms used in my invention, the heating surface is heated uniformly so as to have the same temperature at all points. In the species of my process now under discussion, the employment of a higher temperature at the entrance point of the liquid facilitates the sudden or extra rapid heating of the liquid which is an important feature of the invention. Fig. 14 illustrates a form of apparatus suitable for carrying out this species of my process, The sterilizer may be of any suitable construction. In Fig. 14 it consists of a corrugated wall or surface 1 over which the liquid, supplied by a tube 2 and a deflector or curved distributer 3, flows down in a very thin film, to pass out at the outlet 4. The wall 1 is heated by a surrounding steam jacket 5 which in the form illustrated is divided by a partition 6 into two compartments 7 and 8 respectively to which steam, hot air or other suitable heating means may be supplied through inlets 9 and 10 respectively, such heating medium leaving through outlets 11 and 12 respectively. This arrangement permits me to use different temperatures in the two compartments. The upper chamber 7 is for heating chiefly that portion of the wall 1 which receives the liquid directly from the distributer 3. Let us assume that sterilization is to be accomplished at a temperature of 85° centigrade which, if it is applied for a short time, will not destroy the valuable natural properties of milk and particularly its curdling property, but will suffice to kill all microbes if maintained at the proper height during the requisite period. For this purpose, the heating medium supplied to the upper compartment 7 will have a temperature above the sterilization temperature, say about 95° centigrade. The lower compartment 8 will receive a heating medium of a temperature equal to the sterilization temperature, say 85°. As the liquid flowing through the tube 2 is cold, its temperature, upon striking the upper portion of the wall 1, which is heated to 95°, will be raised only to 85° or thereabout, and this temperature will be maintained as the liquid flows down on the wall 1. It will be seen that the temperature employed by me is not high enough to condense the milk by evaporation or to dry it.

The partition 6 is not always essential and may be omitted, so that the heating chamber will consist of but one compartment. The temperature of the heating medium is say 95° and therefore higher than the sterilization temperature, but of course the absorption of heat by the milk lowers the temperature of the heating medium so that the lower portions of the wall 1 are heated to only about 85°. The action in this case is therefore practically the same as with the form shown in Fig. 14. Sterilization may be assisted by means other than sudden changes of temperature, as by sudden variations of pressure.

When my process is applied to the sterilization of milk, it may be desirable to employ special means to insure the killing of tuberculosis bacilli. It is well known that these bacilli are surrounded by a slimy coat so that the sterilizing temperature cannot effectively reach the bacilli. According to my invention, the difficulty may be overcome by treating the milk immediately before the sterilization with suitable cutting or disintegrating devices, for which purpose grids or screens are particularly effective. The slimy coat enveloping the bacilli is thus torn to expose the bacilli to the full action of the sterilizing temperature.

In this species of my invention, it is immaterial how the sterilization proper is effected and also what particular construction of disintegrating device is employed. The important point is to expose the bacilli by tearing open their slimy envelops before the sterilization proper. This result may be obtained in various ways, the simplest of which consists in interposing grids or sieves of suitable fineness in the stream of milk flowing to the sterilizer. The coats having thus been torn open, the individual streams of milk may be united again before the milk reaches the sterilizer. Instead of this, suitable atomizers may be provided in the path of the milk flowing to the sterilizer, so as to not only subdivide the milk but tear apart the coats enveloping the bacilli. This latter mode forms a transition to those species in which the sterilization proper is effected with spraying of the milk. If in those species of my invention in which the milk is sprayed within the sterilizer, the character of the spraying is such as to break up the slimy coats enveloping the bacilli, such fine spraying in connection with the sterilization will be sufficient to kill the tuberculosis bacilli.

The description given above will show clearly that the sudden change of temperature may be assisted by various expedients to insure a thorough sterilization.

According to an other form of my invention, the surfaces over which the liquid under treatment flows, are given a shape such as to insure a predetermined wetted surface or area, and the liquid is discharged at such a rate that it will remain on said surface a proper length of time for efficient heating. Amount, length of travel, and time should bear a proper relation to each other. In this manner, I am enabled to obtain a sudden change of temperature and a thorough removal of germs without injury to the elements of the liquid. The mere selection of amount, length of travel, and time in proper proportions will without further expedients and without detrimental results, insure the production of thin films. As an example of such sterilization on surfaces, I will assume that a surface of from ⅛ to ⅜ of a square meter per hour and per 100 liters of liquid is to be wetted, with a length of travel amounting to from 70 to 140 centimeters. In accordance with these proportions, if the capacity of the apparatus is to be 250 liters per hour, the total surface would have to be 1¼ square meters and the length of travel from 70 to 80 centimeters. An apparatus having a capacity of 500 liters per hour, would have a total wetted surface of 1.85 square meters and a liquid path of 1 meter length; an apparatus of a capacity of 1000 liters per hour would have a total wetted surface of 2.20 square meters and a path of travel of from 1.3 to 1.4 meters. The important point is the total wetted surface; the length of the liquid path may be lessened by increasing the diameter of the apparatus. The shape of these surfaces is of secondary importance, and it is immaterial whether they are stationary or movable. It is advisable to have the apparatus contract or taper toward the outlet.

Various modifications may be made without departing from the nature of my invention as set forth in the appended claims.

I claim:

1. Process for sterilizing liquids, which consists in reducing them to a condition of extreme thinness and subjecting them while in this condition to a sudden change of temperature while maintaining the temperature below the boiling point of the liquid.

2. Process for sterilizing liquids, which consists in reducing them to a condition of extreme thinness and subjecting them while in this condition to sudden changes of temperature and internal pressure.

3. Process for sterilizing liquids, which consists in reducing them to a condition of extreme thinness under the influence of centrifugal force and subjecting them while in this condition, to a sudden change of temperature while maintaining the temperature below the boiling point of the liquid.

4. Process for sterilizing liquids, which consists in subjecting them while in a condition of extreme thinness, to a sudden change of temperature, and then maintaining the liquid, in a continuous condition, at a substantially uniform temperature, while maintaining the temperature below the boiling point of the liquid.

5. Apparatus for sterilizing milk and other liquids, comprising rotary bodies for bringing the liquid under the influence of centrifugal force into a condition of extreme thinness, means for heating said bodies, and additional means for heating the liquid after its subdivision.

6. Apparatus for sterilizing milk and other liquids, comprising rotary bodies provided with spraying means forming barriers in the path of the liquid propelled by centrifugal force, and means for heating the liquid after it has been acted upon by said bodies and spraying means.

7. Apparatus for sterilizing milk and other liquids, comprising a rotary body for projecting the liquid under the influence of centrifugal force, means for conveying the liquid to said body in the condition of a spray, and means for heating the liquid.

8. Apparatus for sterilizing milk and other liquids, comprising a preliminary heating device and means for bringing the liquid in contact therewith in a state of extreme thinness, and a main heating device which the liquid reaches subsequently in a state of thinness not so great as on said preliminary heating device.

9. Apparatus for sterilizing milk and other liquids, comprising a heated surface or wall, and a rotary body for projecting the liquid to be treated, against said wall so as to subject the liquid to strong internal pressure followed by a relief of pressure.

10. Process of sterilizing milk and other liquids, which consists in bringing the liquid under the influence of centrifugal force into a condition of extreme thinness, and heating it, while in such condition, under a pressure less than atmospheric pressure, to a temperature below the boiling point of the liquid.

In testimony whereof, I have signed this specification in the presence of two subscribing witnesses.

DR. OSKAR LOBECK.

Witnesses:
  RUDOLPH FRICKE,
  ALICE DUNGER.